UNITED STATES PATENT OFFICE.

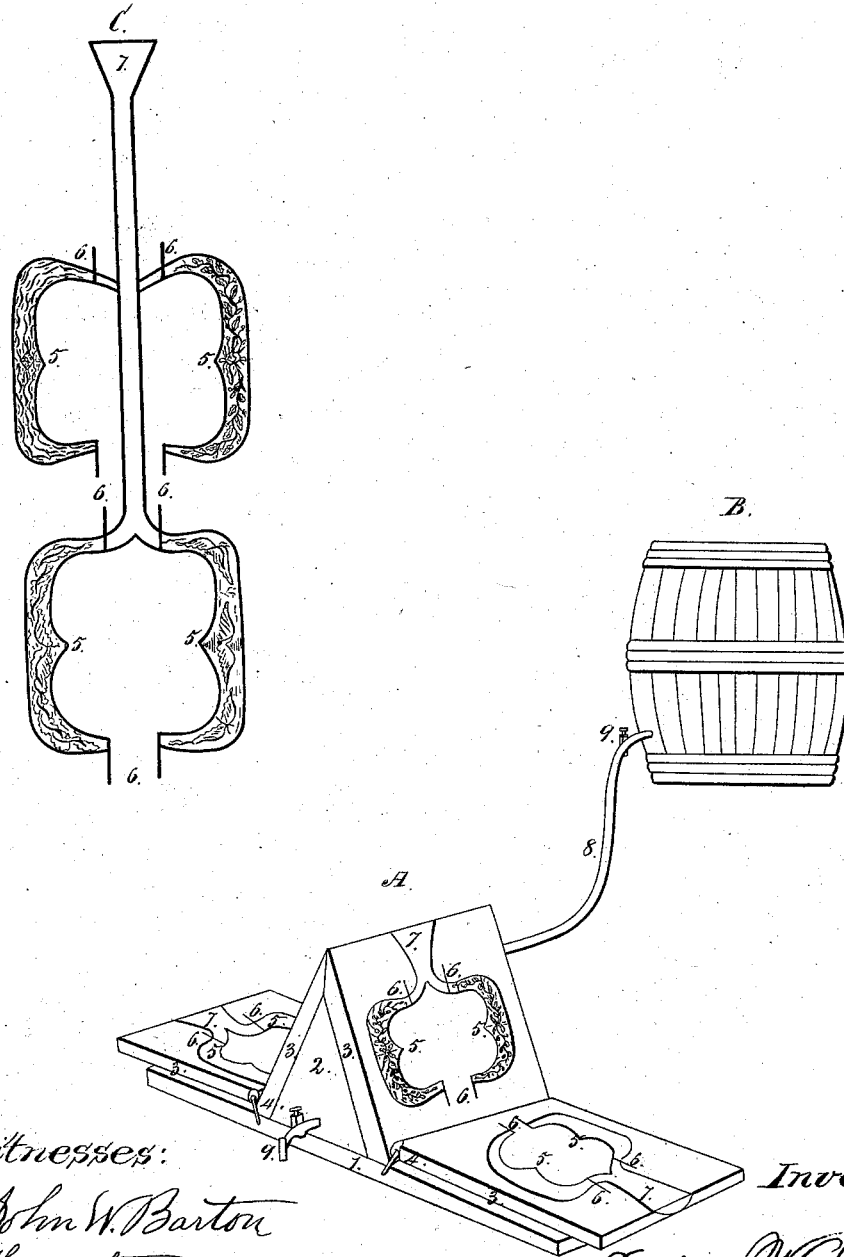

DEMING W. SEXTON, OF EAST HAMPTON, CONNECTICUT.

IMPROVEMENT IN CASTING COFFIN-HANDLES.

Specification forming part of Letters Patent No. 48,215, dated June 13, 1865.

*To all whom it may concern:*

Be it known that I, DEMING W. SEXTON, of East Hampton, of the county of Middlesex, in the State of Connecticut, have invented a new and Improved Device for Casting Coffin-Handles; and I do hereby declare that the following is a full and exact description thereof, reference being had to the accompanying drawings, and to the letters and figures of reference marked thereon.

The nature of my invention consists in a peculiar shaped and arranged mold, whereby I produce two double molds, and is kept in an even temperature by means of water.

To enable others skilled in the art to make and use my invention, I will proceed to describe its construction and operation.

I construct a triangular-shape frame on a base, the two side angles forming the base for the molds, whereby they are brought to a sharp edge at the top of the gate which divides the metal when poured, and allows it to run down each angle into each mold, which, opening on hinges at the bottom, draws the work off the frame, the wires in the handle being held by a spring to the hinged part of the mold. This frame is provided with a hollow chamber for the purpose of receiving water for cooling the molds by means of a water-pipe leading from the water-cask into one end of the hollow chamber in this frame, and a faucet in the other end, through which any desired quantity of water is made to run, in order to keep the molds in the right temperature.

The frame and molds may be one and the same thing; or the molds may be screwed to the frame with packing around the edge to make it tight, and may be used with or without water.

The handles are placed lengthwise in the mold with the bows out, the two ends pointing together, placing the top ends close together, in order to make the shortest gateway possible. If two or more set or pairs of handles are to be put in one of the double molds, they are placed one above the other.

The metal may run down through the upper handles into the lower ones by a short gate connecting the two ends of the handles, or the gateway may run down between the ends of the upper handles into the lower ones.

Letter A represents the mold. Letter B repsents the water-cask. Letter C represents a section of the mold with two pair of handles.

Figure 1 represents the base. Fig. 2 represents the frame. Fig. 3 represents the mold. Fig. 4 represents hinge in the mold. Fig. 5 represents the handle. Fig. 6 represents the wire in the handle. Fig. 7 represents the gateway or sprue. Fig. 8 represents the water-pipe. Fig. 9 represents the faucet.

What I claim as new, and desire to secure by Letters Patent, is—

The within-described device, consisting of the triangular mold or drag 3 3, with the respective hinged copes, constructed substantially as and for the purpose herein described.

DEMING W. SEXTON.

Witnesses:
JOHN W. BARTON,
HENRY STRONG.